Nov. 20, 1951     W. H. WANNAMAKER, JR     2,576,056
ANALYZING APPARATUS
Original Filed Aug. 19, 1947

*INVENTOR.*
WILLIAM H. WANNAMAKER JR.

BY

ATTORNEY.

Patented Nov. 20, 1951

2,576,056

UNITED STATES PATENT OFFICE 2,576,056

ANALYZING APPARATUS

William H. Wannamaker, Jr., Flourtown, Pa., assignor, by mesne assignments, to Minneapolis-Honeywell Regulator Company, Minneapolis, Minn., a corporation of Delaware Original application August 19, 1947, Serial No. 769,555, which is a division of application Serial No. 585,125, March 27, 1945. Divided and this application August 11, 1948, Serial No. 43,742

4 Claims. (Cl. 323—4)

The present invention relates to apparatus for analyzing and studying automatic regulation and control procedures, and, more especially, pertains to a novel constant current device which is especially well adapted for use in apparatus for artificially creating or duplicating characteristics of various physical processes in order to facilitate investigation of the effect of said characteristics and/or the effect of inherent qualities of the automatic control apparatus on the automatic regulation or control obtained.

This application is a division of my prior application, Serial No. 769,555, filed August 19, 1947, now Patent No. 2,519,615 of August 22, 1950, which patent, in turn is a division of my prior application, Serial No. 585,125, filed March 27, 1945, now Patent No. 2,453,053 of November 2, 1948. Said prior applications disclose and claim a novel analog device which offers advantages of versatility which render it especially suitable and desirable for accomplishing in the laboratory fundamental investigations of automatic control procedures. As is discussed in said prior applications, the disclosed apparatus advantageously includes a constant current device which operates to provide current flow through an impedance which is independent in magnitude of the magnitude of the impedance.

In the disclosed analog apparatus, such a device represents a control means, such as a valve, which provides a flow of a condition-changing agent at a rate which is determined by a control signal but which is independent of the magnitude of the load into which the control means operates. Since in the disclosed analog apparatus the controlled load is represented by a resistance-capacitance network, the simulated control means or valve advantageously is a constant current device operative to produce through the impedance of the resistance-capacitance network an electrical current flow of substantially constant magnitude irrespective of the magnitude, over a wide range of variation, of said impedance.

Accordingly, it is a specific object of the present invention to provide a simple and efficient electrical circuit arrangement for creating through an impedance load a current flow which is practically independent of the magnitude of said impedance. It is also an object of the invention to provide such an electrical circuit arrangement which includes readily adjustable means for varying the amplitude of said electrical current and also for varying the range through which changes in the magnitude of an input or control signal vary the electrical current which is caused to flow through the impedance load.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described a preferred embodiment of the invention.

Figure 1:
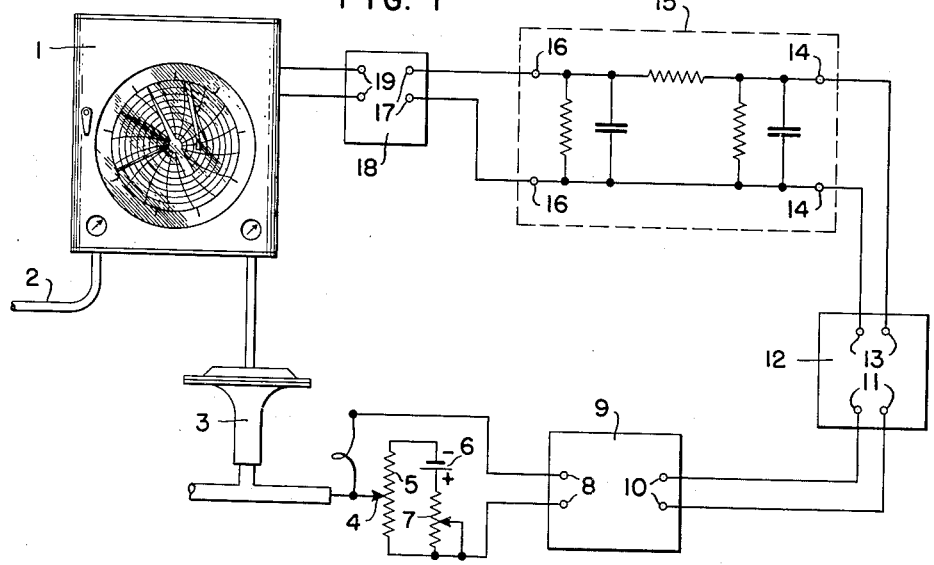
Fig. 1 is a diagrammatic illustration of a preferred form of analog apparatus including the novel constant current or current input device of the present.

I have illustrated in Fig. 1 a diagrammatic representation of the basic analog apparatus disclosed and claimed by me in my aforementioned prior applications. Although the disclosed analog apparatus is readily adaptable for use with any one of a number of available industrial controllers, I have illustrated the controller as comprising a self-balancing potentiometer 1 equipped with pneumatic control means which is supplied with air from a suitable source through a pipe 2. The controller 1 is operative to utilize the air supplied through the pipe 2 for causing the air pressure to a diaphragm motor 3 to position a sliding contact 4 along a slide wire resistance 5. The instrument 1 and pneumatic control means including the diaphragm motor 3 may well be of the type commercially manufactured and sold by the Brown Instruments Division of the Minneapolis-Honeywell Regulator Company, such potentiometric and control devices being respectively disclosed in the Wills Patent No. 2,423,540 of July 8, 1947, and in the Moore Patent No. 2,125,081 of July 26, 1938.

A battery 6 and an adjustable resistance 7 are connected across the slidewire resistance 5 for producing a voltage drop of known magnitude across the latter. A portion of this voltage drop is tapped off the slidewire 5 by the sliding contact 4 for deriving a voltage of variable magnitude which is impressed on the terminals 8 of a unit 9 which I have for convenience termed a dead time unit. The output terminals 10 of the dead time unit 9 are connected to the input terminals 11 of a unit 12, conveniently termed a constant current or current input unit, having output terminals 13 which are connected to the input terminals 14 of a unit designed to simulate the capacity and transfer lags of a process under investigation and comprising a resistance-capacitance network 15.

The values of resistance and capacitance in the network 15 in the closed circuit control system of Fig. 1 determine the characteristics of the simulated process under control. The various values of the condensers and resistances are so chosen as to introduce a delay in the voltage transfer through the network from the input terminals 14 to the output terminals 16 corresponding to the delay (resulting from the capacity and transfer lags of the process) occurring between the time a change in the supply of a controlling agent to an actual process under control is made and the time when the process has attained a stabilized condition with the new supply of controlling agent.

The output terminals 16 of the network 15 are connected to the input terminals 17 of an electronic voltmeter 18 having output terminals 19 which are connected to the input terminals of the potentiometer controller 1.

The current input unit 12 is employed to provide a source of current in its output circuit which is regulated in value by adjustment of the voltage applied to its input terminals 11, and the range of values of which may also be varied as desired. A characteristic of the current input unit is that it may be utilized to simulate a mechanical valve, for example, regulating the flow of fuel to a furnace, the valve opening being adjusted in accordance with the voltage impressed on the input terminals 11. Means to be described are also included in the current input unit for varying the size of the simulated valve.

Figure 2:
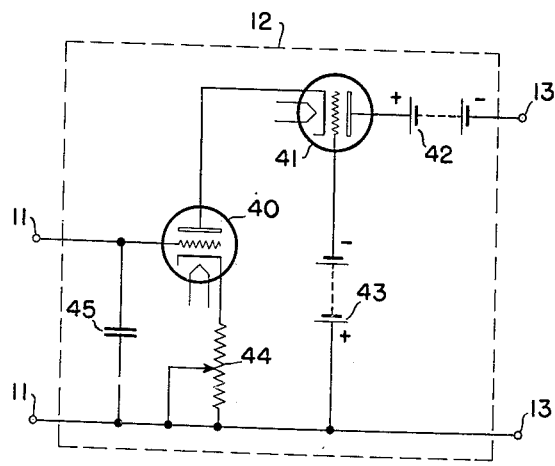
Fig. 2 is a schematic circuit diagram showing the details of the constant current unit of the present invention broadly shown in Fig. 1.

Specifically, as shown in Fig. 2, the current input 12 of the present invention is provided with two heater-type triodes respectively indicated by the reference numerals 40 and 41, a battery 42 for supplying anode or output current to both of the triodes in series, a battery 43 for supplying suitable bias voltage to the input circuit of the triode 41, and an adjustable resistance 44 for supplying suitable bias voltage to the input circuit of the triode 40. It will be understood that suitable regulated voltage supplies energized from a commercial alternating current source may be employed, instead of batteries 42 and 43, if desired. A condenser 45, which preferably is of small value, is connected across the input terminals 11 for smoothing out the voltage pulsations applied to the input terminals of the current input unit 12 from the output terminals of the dead time unit 9 and to stabilize the potential of the control grid of triode 40 during the switching intervals.

The operation of the current input unit 12 in maintaining a substantially constant flow of current in its output circuit, notwithstanding changes in the voltage of the battery 42 and changes in the magnitude of the load impedance between the terminals 13 (offered by the network 15), may be mathematically explained in the following manner.

Tracing through the complete circuit having connected therein the impedance network 15 and the anode-cathode circuits of the triodes 40 and 41, Equation 1 may be obtained by application of Kirckhoff's principle that the sum of the voltage drops in a closed circuit must be equal to zero.

$$I_p (R_{15}+R_{44}) - u_{40}(E_{11}+I_pR_{44}) + I_pR_{40} - u_{41}[E_{43}+I_pR_{44}+I_pR_{40}-u_{40}(E_{11}+I_pR_{44})] + I_pR_{41} - k = 0 \quad (1)$$

where $R_{15}$ is the load resistance presented by the impedance network 15 between the output terminals 13 of the current input unit 12; $I_p$ is the output current flow from the current input unit 12 through the impedance network 15; $R_{44}$ is the resistance of the cathode bias resistor 44; $u_{40}$ and $u_{41}$ are the amplification factors of the triodes 40 and 41, respectively; $R_{40}$ and $R_{41}$ are the anode to cathode resistances of triodes 40 and 41, respectively; $E_{11}$ is the signal voltage impressed across the input terminals 11 of the current input unit 12 from the slidewire resistance 5; $E_{43}$ is the voltage of battery 43; and $k$ is a constant.

Differentiating Equation 1 with respect to $R_{15}$, Equations 2, 3 and 4 are obtained:

$$I_p + \frac{\partial I_p}{\partial R_{15}}(R_{15}+R_{44}-u_{40}R_{44}+R_{40}-u_{41}R_{44}-u_{41}R_{40}+u_{40}u_{41}R_{44}+R_{41}) = 0 \quad (2)$$

$$\frac{\partial I_p}{\partial R_{15}} = -\frac{I_p}{R_{15}+R_{44}-u_{40}R_{44}+R_{40}-u_{41}R_{44}-u_{41}R_{40}+u_{40}u_{41}R_{44}+R_{41}} \quad (3)$$

Equation 4 is obtained by transposing and by substituting P for $$\frac{R_{44}+R_{40}+R_{41}}{R_{15}}$$

in Equation 3.

$$\frac{\partial I_p}{I_p} = -\frac{\partial R_{15}}{R_{15}}\left(\frac{1}{1+P+\frac{R_{44}}{R_{15}}(u_{40}u_{41}-u_{40}-u_{41})-u_{41}\frac{R_{40}}{R_{15}}}\right) \quad (4)$$

As those skilled in the art will understand, the quantity $$\frac{\partial I_p}{I_p}$$

represents the ratio of the current change in the output circuit of the current input unit 12 for a given change in impedance between the output terminals 13. By inspection of Equation 4 it may be observed that the current $I_p$ flowing in the output circuit of the current input unit 12 is substantially independent of the magnitude of the load impedance $R_{15}$ over a range extending from zero up to one megohm and higher values of resistance.

Merely by way of illustration, and not limitation, it is noted that, when triodes 40 and 41 are of the commercially available 7F7 type, the other circuit components of the current input unit 12 may have the following values:

| Part | Value |
| --- | --- |
| 44 | 5,000-150,000 ohms. |
| 42 | 300 volts. |
| 43 | 80 volts. |
| 45 | 0.05 Microfarad. |

When these circuit components are employed and resistances $R_{15}$ and $R_{44}$, for example, are assigned values of 500,000 ohms and 100,000 ohms respectively, the value of the quantity $$\frac{1}{1+P+\frac{R_{44}}{R_{15}}(u_{40}u_{41}-u_{40}-u_{41})-u_{41}\frac{R_{40}}{R_{15}}}$$

may be readily calculated and found to be approximately 0.001 when the anode to cathode resistances of each of the triodes 40 and 41 is assumed to be 20,000 ohms and the amplification factor $u$ of each of the triodes is assumed to be 70. Accordingly, the change in output current flow from the current input unit 12 upon change in the magnitude of the load resistance $R_{15}$ will be $$\frac{\partial R_{15}}{R_{15}}(0.001)$$

or, in other words, only 0.1% of the ratio $$\frac{\partial R_{15}}{R_{15}}$$

the over-center position of said inner loop end. Thus, if the change in load resistance $R_{15}$ is 250,000 ohms, the change in output current flow from the current input unit 12 with respect to its original value will have the value of $$\frac{250,000}{500,000}(0.001)$$

or 0.05%. Consequently, there is an insignificant change in the flow of current from the output circuit of the current input unit 12 upon a change in the value of the load resistance $R_{15}$ over an extended range.

Figure 3:
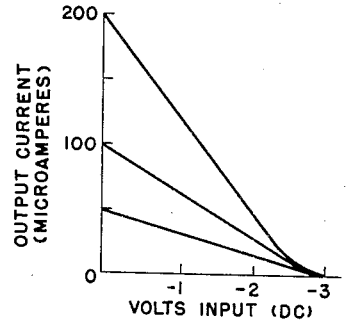
Fig. 3 is a graph showing the output current versus applied input voltage relation of the constant current device of Fig. 2.

Fig. 3 is a graph illustrating curves of anode or output current flow in the output circuits of the triodes 40 and 41 plotted against voltage impressed on the input terminals 11 from the dead time unit 9 for various values of resistance 44. In this graph it is contemplated that the load impedance connected in the output circuit of the triodes 40 and 41 may have any value from zero to at least one megohm or higher values, if desired.

The output current flow derived from the current input unit 12 is impressed upon the input terminals 14 of the resistance-capacitance network 15 constituting the simulated process. The value of the current flow to the resistance-capacitance network 15 is a function of and is determined by the voltage impressed on the input terminals 11 of the current input unit 12 from the dead time unit 9. The output voltage variations which appear between the output terminals 16 of the resistance-capacitance network 15 simulate the variable being measured for an actual process, such, for example, as the temperature within a furnace. In order to measure the voltage variations between the terminals 16, the vacuum tube voltmeter 18 is employed in conjunction with the potentiometer controller 1. The vacuum tube voltmeter 18 serves as an impedance matching device to permit the proper functioning of the potentiometer controller 1 which, controllers ordinarily are designed to work from low voltage, low impedance circuits.

Subject matter disclosed in this application and not claimed herein is disclosed and is being claimed in the copending application of Donald P. Eckman and William H. Wannamaker, Jr., bearing Serial No. 585,124 and filed on March 27, 1945, now Patent No. 2,470,434 of May 17, 1949, and in my copending application bearing Serial No. 43,741 and filed on even date herewith, the last mentioned application having issued as Patent No. 2,488,505 on November 15, 1949.

While, in accordance with the provisions of the statutes, I have illustrated and described a preferred embodiment of the present invention, those skilled in the art will understand that changes may be made in the form of the apparatus disclosed without departing from the spirit of my invention as set forth in the appended claims, and that some features of the present invention may sometimes be used to advantage without a corresponding use of other features.

Having now described my invention, what I claim as new and desire to secure by Letters Patent, is as follows:

1. Apparatus for producing through an impedance an electrical current flow of substantially constant magnitude irrespective of the magnitude, over a wide range of variation, of said impedance, comprising first and second electronic valves, each of said valves having an output circuit and a control circuit, a pair of energizing terminals adapted to be connected to a source of anode supply voltage, a pair of output terminals adapted to be connected across said impedance, conductor means connecting said energizing terminals, said output terminals, and the output circuits of said valves in a closed series circuit and operative to permit current flow through said impedance from said source under the control of the conductivities of the output circuits of said valves, self bias means for one of said valves, conductor means adapted to connect a source of control voltage and said self bias means in a series circuit including the control circuit of said one of said valves, and conductor means adapted to connect bias means in the control circuit of the other of said valves, the last mentioned bias means including said self bias means and the output circuit of said one of said valves connected in series.

2. Apparatus for producing through an impedance an electrical current flow of substantially constant magnitude irrespective of the magnitude, over a wide range of variation, of said impedance, comprising first and second electronic valves, each of said valves having an anode and a cathode included in an output circuit and having a control grid included with the associated cathode in a control circuit, a pair of energizing terminals adapted to be connected to a source of anode supply voltage, a pair of output terminals adapted to be connected across said impedance, conductor means connecting said energizing terminals, said output terminals, and the output circuits of said valves in a closed series circuit and operative to permit current flow through said impedance from said source under the control of the conductivities of the output circuits of said valves, a bias resistor, conductor means adapted to connect a source of control voltage and said resistor in a series circuit including the control circuit of one of said valves, and conductor means adapted to connect a source of bias voltage, said resistor, and the output circuit of said one of said valves in series with the control circuit of the other of said valves.

3. Apparatus for producing through an impedance an electrical current flow of substantially constant magnitude irrespective of the magnitude, over a wide range of variation, of said impedance, comprising first and second electronic valves, each of said valves having an anode and a cathode included in an output circuit and having a control grid included with the associated cathode in a control circuit, a pair of energizing terminals adapted to be connected to a source of anode supply voltage, a pair of output terminals adapted to be connected across said impedance, conductor means connecting said energizing terminals, said output terminals, and the output circuits of said valves in a closed series circuit and operative to permit current flow through said impedance from said source under the control of the conductivities of the output circuits of said valves, an adjustable cathode bias resistor included in said series circuit adjacent the cathode of one of said valves, conductor means adapted to connect a source of control voltage in a series circuit including the control circuit of said one of said valves and said resistor, and conductor means adapted to connect a source of bias voltage, said resistor, and the output circuit of said one of said valves in series with the control circuit of the other of said valves.

4. Apparatus for producing through an impedance an electrical current flow of substantially constant magnitude irrespective of the magnitude, over a wide range of variation, of said impedance, comprising first and second electronic valves, each of said valves having an anode and a cathode included in an output circuit and having a control grid included with the associated cathode in a control circuit, a pair of energizing terminals adapted to be connected to a source of anode supply voltage, a pair of output terminals adapted to be connected across said impedance, an adjustable cathode bias resistor, conductor means connecting said energizing terminals, said output terminals, and said resistor in series between the cathode of one of said valves and the anode of the other of said valves, one end terminal of said resistor being directly connected to the cathode of said one of said valves, conductor means connecting the anode of said one of said valves directly to the cathode of said other of said valves, thereby to permit current flow through said impedance from said source under control of the conductivities of the output circuits of said valves, conductor means adapted to connect a source of control voltage between the control grid of said one of said valves and the other end terminal of said resistor, and conductor means adapted to connect a source of bias voltage between the control grid of said other of said valves and said other end terminal of said resistor.

WILLIAM H. WANNAMAKER, JR.

REFERENCES CITED

The following references are of record in the file of this patent:

UNITED STATES PATENTS

| Number | Name | Date |
|---|---|---|
| 1,858,271 | Harness et al. | May 17, 1932 |

OTHER REFERENCES

Current Stabilizers—Proceedings of IRE, vol. 32, No. 7, July 1944.